(12) United States Patent
Kulpa

(10) Patent No.: US 7,247,791 B2
(45) Date of Patent: Jul. 24, 2007

(54) SECURITY BARRIER FOR ELECTRONIC CIRCUITRY

(75) Inventor: Walter J. Kulpa, Trumbull, CT (US)

(73) Assignee: Pitney Bowes Inc., Stamford, CT (US)

( * ) Notice: Subject to any disclaimer, the term of this patent is extended or adjusted under 35 U.S.C. 154(b) by 482 days.

(21) Appl. No.: 10/855,689

(22) Filed: May 27, 2004

(65) Prior Publication Data
US 2005/0275538 A1 Dec. 15, 2005

(51) Int. Cl.
*H02G 3/08* (2006.01)

(52) U.S. Cl. .................. 174/50; 174/559; 174/17 R; 174/60; 174/520; 361/752; 439/188

(58) Field of Classification Search .............. 174/50, 174/559, 17 R, 60, 135, 520; 439/188; 340/568.2, 340/650, 686.1; 361/730, 737, 752; 200/202, 200/334, 333, 318
See application file for complete search history.

(56) References Cited

U.S. PATENT DOCUMENTS

| | | | | |
|---|---|---|---|---|
| 5,369,548 A | * | 11/1994 | Combs | 361/643 |
| 5,380,968 A | * | 1/1995 | Morse | 200/302.3 |
| 6,469,626 B1 | * | 10/2002 | Hung | 340/568.2 |
| 6,512,454 B2 | * | 1/2003 | Miglioli et al. | 340/541 |
| 6,626,697 B1 | * | 9/2003 | Martin et al. | 439/488 |
| 6,970,360 B2 | * | 11/2005 | Sinha | 361/752 |
| 6,989,747 B2 | * | 1/2006 | Konecnik | 340/568.2 |
| 7,046,144 B2 | * | 5/2006 | Stephen-Daly et al. | 340/568.1 |
| 7,064,960 B2 | * | 6/2006 | Schroer et al. | 361/752 |
| 7,085,138 B2 | * | 8/2006 | Origlia | 361/752 |

* cited by examiner

*Primary Examiner*—Dhiru R. Patel
(74) *Attorney, Agent, or Firm*—George M. MacDonald; Angelo N. Chaclas; Steven J. Shapiro

(57) ABSTRACT

An enclosure for protecting at least a portion of a printed circuit board that includes a top and bottom cover each having an insulating layer between an outer conductive layer and an inner conductive layer. Each outer conductive layer and each inner conductive layer are electrically connected to a voltage source to form tamper detection circuits. The enclosure further includes cover switches to detect attempts to lift or remove the covers and a thermal sensor/switch or the like for indicating that a temperature inside the enclosure has moved past a predetermined level due to a tamper attempt. A detection circuit generates and transmits a signal to cause sensitive information contained in one or more electronic components provided on the circuit board to be erased when a tamper attempt is detected.

30 Claims, 3 Drawing Sheets

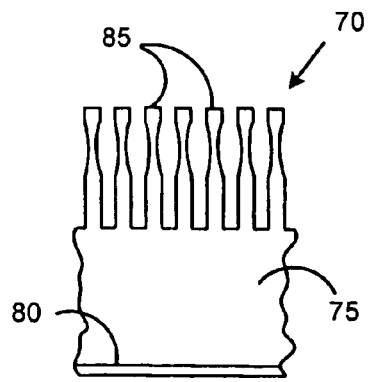
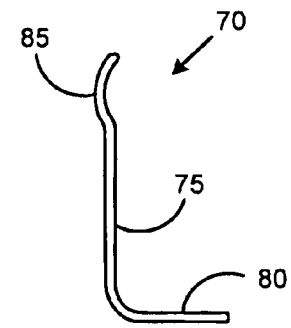
FIG. 3A  FIG. 3B
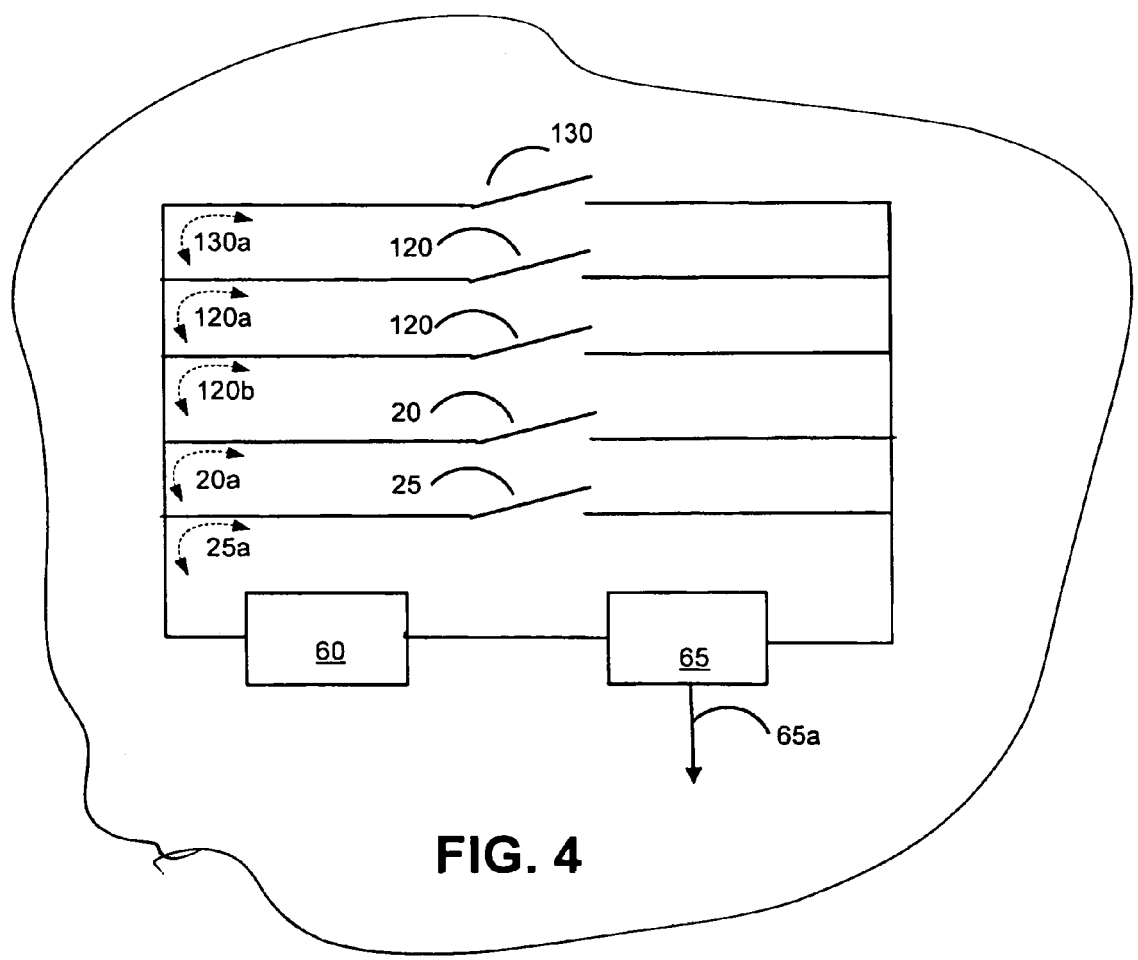
FIG. 4

SECURITY BARRIER FOR ELECTRONIC CIRCUITRY

FIELD OF THE INVENTION

The present invention relates to tamper detection and protection for electronic circuitry, and more particularly, to an enclosure for covering electronic circuitry, such as a printed circuit board or a selected portion of a printed circuit board, and detecting attempts to access and tamper with the electronic circuitry.

BACKGROUND OF THE INVENTION

In many electronic applications, it is often desirable or even required to protect electronic circuitry, such as on a printed circuit board (PCB) or a portion thereof, from unlawful or unauthorized access. This is especially true for electronic circuitry that includes cryptographic modules or functionality. For example, postage security devices (PSDs) are required by the United States Postal Service to comply with FIPS 140-2 level 3 issued by the National Institute of Standards and Technology (NIST). FIPS 140-2 level 3 requires that PSDs have a full envelope of physical tamper protection and detection which encloses all electrical nodes.

It is known in the prior art to protect PCBs from tampering by enclosing the PCB in an enclosure, such as a metal case. Such an enclosure provides a physical barrier against tamper attempts. Such enclosures alone, however, are vulnerable to physical attacks such as drilling through the enclosure to gain access to the electronic circuitry. Other prior art methods of tamper protection involve wrapping the entire electronic circuitry, such as a PCB, in a tamper barrier wrap. Such wraps include a flexible film made of, for example, poly vinylidene fluoride (PVDF) and typically further include circuit elements used in detecting tamper attempts. The wrap in such methods is then typically hand soldered to the electronic circuitry to complete the detection circuits and potted using an encapsulating epoxy or the like. Due to the required manual soldering and potting, these methods are typically time consuming and not well suited to automated/mass production. In addition, commercially available tamper barrier wraps are relatively expensive, thereby adding significantly to the overall cost of making tamper protected circuitry.

SUMMARY OF THE INVENTION

The present invention relates to an enclosure for covering and protecting from tamper attempts at least a portion of a printed circuit board. The enclosure includes a top cover for covering a top side of the printed circuit board and a bottom cover for covering a bottom side of the printed circuit board. The top cover includes a first outer conductive layer, a first inner conductive layer, and a first insulating layer in between the conductive layers, wherein the first outer conductive layer and the first inner conductive layer are electrically connected to a voltage source to form a first circuit. The bottom cover includes a second outer conductive layer, a second inner conductive layer, and a second insulating layer in between the conductive layers, wherein the second outer conductive layer and the second inner conductive layer are electrically connected to the voltage source to form a second circuit. The enclosure further includes a first cover switch provided on the top side of the printed circuit board that is electrically connected to the voltage source to form a third circuit. The first cover switch is in an open position when the top cover is provided on the top side and in a closed position when the top cover is lifted away from the top side. The enclosure also includes a second cover switch provided on the bottom side of the printed circuit board that is electrically connected to the voltage source to form a fourth circuit. The second cover switch is in an open position when the bottom cover is provided on the bottom side and in a closed position when the bottom cover is lifted away from the bottom side. A device is provided for indicating that a temperature inside the enclosure has moved past a predetermined level. Finally, a detection circuit is provided for generating and transmitting a signal to cause certain information contained in one or more electronic components provided on the printed circuit board to be erased when the detection circuit detects a voltage from the voltage source being present on the first circuit, the second circuit, the third circuit or the fourth circuit or when the detection circuit receives an indication that the temperature has moved past the predetermined level. The voltage is present on the first circuit when the first outer conductive layer is brought into electrical contact with the first inner conductive layer, on the second circuit when the second outer conductive layer is brought into electrical contact with the second inner conductive layer, on the third circuit when the first cover switch is in the closed position, and on the fourth circuit when the second cover switch is in the closed position. The predetermined level may be a lower threshold level, wherein an indication is provided that the temperature inside the enclosure has moved below that lower threshold level. Alternatively, or additionally, the predetermined level may be an upper level threshold, wherein an indication is provided that the temperature has moved above the upper threshold level. To provide the temperature indication, the enclosure may include a thermal sensor/switch electrically connected to the voltage source to form a fifth circuit, wherein the thermal sensor/switch moves from an open position to a closed position when the temperature has moved below the lower threshold level and/or above the upper threshold level, as the case may be, such that the voltage from the voltage source is present on the fifth circuit and indicates to the detection circuit that the temperature has moved above or below the appropriate level.

In the preferred embodiment, the first inner conductive layer is electrically connected to the voltage source by first spring contact fence extending around an outer periphery of the top side and the second inner conductive layer is electrically connected to the voltage source by a second spring contact fence extending around an outer periphery of the bottom side. The first spring fence includes a plurality of spring fingers in contact with the first inner conductive layer and a solid portion electrically connected to a first lead extending around the outer periphery of the top side, wherein the first lead is electrically connected to the voltage source. Also, the second spring contact fence includes a plurality of spring fingers in contact with the second inner conductive layer and a solid portion electrically connected to a second lead extending around the outer periphery of the bottom side, wherein the second lead is electrically connected to the voltage source. In addition, the first outer conductive layer is preferably electrically connected to the voltage source by a first spring contact element extending around an outer periphery of the top side, and the second outer conductive layer is electrically connected to the voltage source by a second spring element extending around the outer periphery of the bottom side. The first spring contact element includes a plurality of spring fingers in contact with the first outer conductive layer and a solid portion electrically connected to a first lead extending around the outer periphery of the top side, wherein the first lead is electrically connected to the voltage source. Similarly, the second spring contact element includes a plurality of spring fingers in contact with the second outer conductive layer and a solid portion electrically connected to a second lead extending around the outer periphery of the bottom side, wherein the second lead is electrically connected to the voltage source.

In one particular embodiment, the first and second insulating layers include a plurality of micro-balloons filled with a conductive material. The conductive material may be a liquid, such as a mild acid or base, or a powder, such as graphite. If an attempt to penetrate the top or bottom cover is made, the micro-balloons will be punctured, releasing the conductive material which aids in bringing the conductive layers into electrical contact with one another.

Therefore, it should now be apparent that the invention substantially achieves all of the above aspects and advantages. Additional aspects and advantages of the invention will be set forth in the description that follows, and in part will be obvious from the description, or may be learned by practice of the invention. Moreover, the aspects and advantages of the invention may be realized and obtained by means of the instrumentalities and combinations particularly pointed out in the appended claims.

DESCRIPTION OF THE DRAWINGS

The accompanying drawings illustrate presently preferred embodiments of the invention, and together with the general description given above and the detailed description given below, serve to explain the principles of the invention. As shown throughout the drawings, like reference numerals designate like or corresponding parts.

FIGS. 3A and 3B are partial front and side plan views, respectively, of the spring contact fence forming a part of the enclosure shown in FIG. 1.

FIG. 4 is a partial schematic of the device of FIG. 1.

DETAILED DESCRIPTION OF THE PREFERRED EMBODIMENTS

Figure 1:
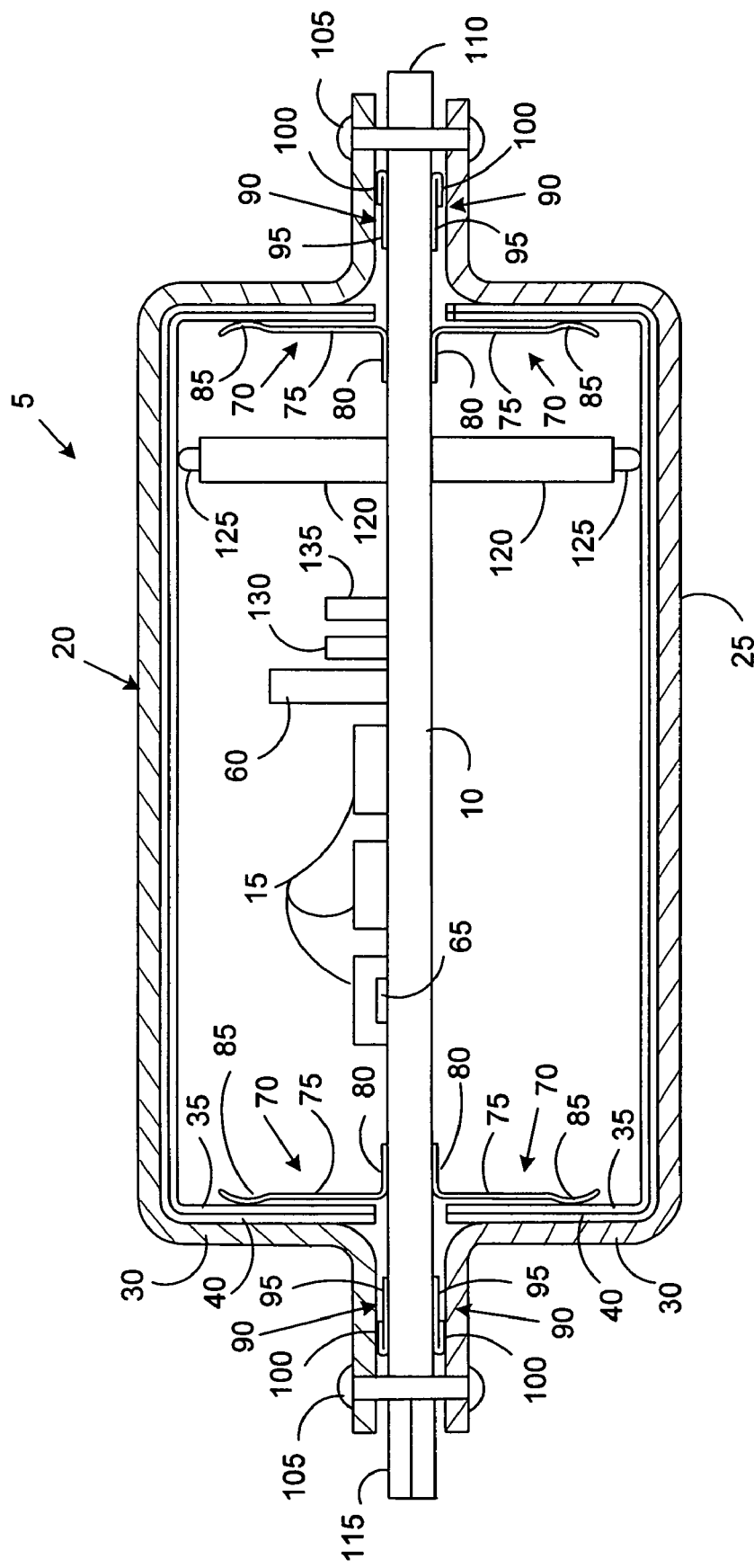
FIG. 1 is a cross-sectional diagram of an enclosure for covering and securing electronic circuitry according to a preferred embodiment of the present invention.

FIG. 1 is a cross-sectional diagram of enclosure 5 according to the present invention. Enclosure 5 is provided to cover a printed circuit board or selected portion of a printed circuit board, such as PCB 10 shown in FIG. 1, in order to protect and secure from tampering the electronic circuitry provided on the printed circuit board, such as electronic components 15 shown on PCB 10. The electronic components being protected may be the vault of a postage meter or some other device that stores and uses sensitive information. Enclosure 5 includes top cover 20 that covers and encloses a top portion of PCB 10, and bottom cover 25 that covers and encloses a bottom portion of PCB 10. Both top cover 20 and bottom cover 25 consist of the following three layers: (1) outer conductive layer 30, (2) inner conductive layer 35, and (3) insulating layer 40 located between outer conductive layer 30 and inner conductive layer 35. These three layers are adhered to one another, preferably by a sprayed on pressure sensitive or reaction curing elastomer adhesive.

Figure 2:
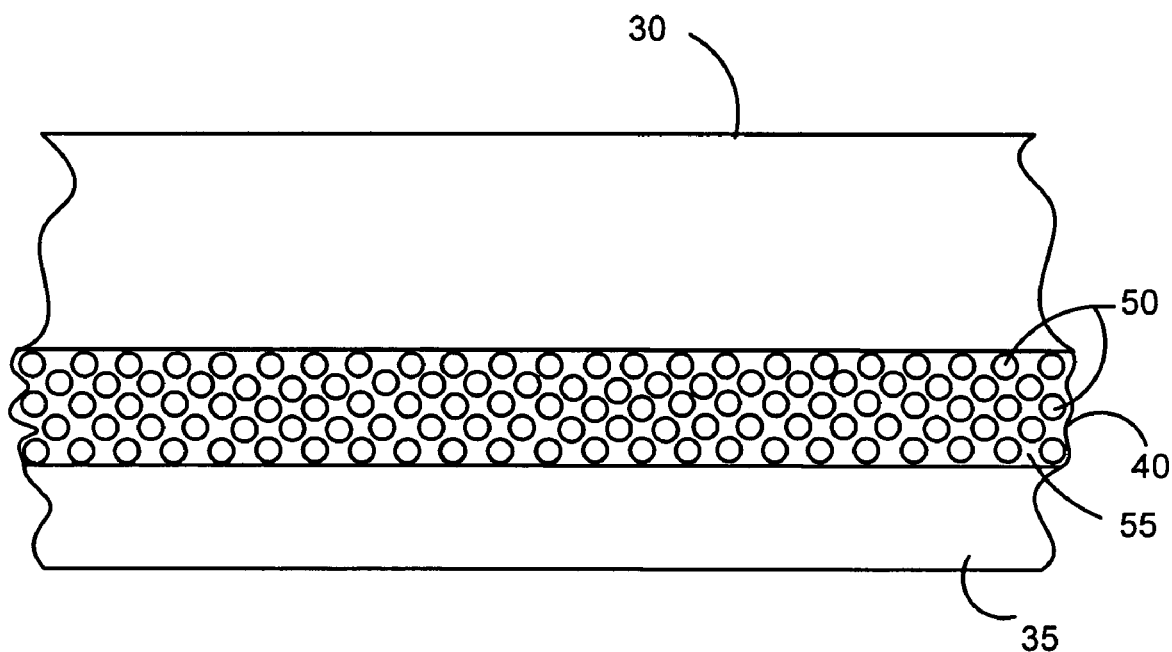
FIG. 2 is a partial cross-sectional diagram of an embodiment of the top or bottom cover forming a part of the enclosure of the present invention.

Outer conductive layer 30 is made of a conductive material such as steel or another suitable metal or even a plastic having a conductive plating applied thereto. To make top cover 20 and bottom cover 25 more difficult to penetrate, such as with a drill or the like, outer conductive layer 30 may be hardened by known methods. Inner conductive layer 35 is similarly made of a conductive material. The conductive material forming inner conductive layer 35 may also be made of steel or another suitable metal (which may also be hardened), or, alternatively, may be made of a thinner conductive material such as a thin aluminum foil or conductive paint that is applied to the inside of insulating layer 40. Insulating layer 40 is made of a thin, preferably 0.005 inches to 0.10 inches thick, insulating material such as vacuum formed thin piece of plastic. In one particular embodiment, shown in FIG. 2, insulating layer 40 may include a plurality of micro-balloons 50 filled with a conductive liquid, such as a mild acid or base, or a conductive powder, such as graphite, that are supported by an insulating support medium 55 such as an insulative epoxy. Such micro-balloons are known in the art (they are often used in perfume or cologne ads in magazines to hold the perfume or cologne until scratched by a reader) and may be made of material such as wax or glass. The purpose of the conductive liquid or powder provided inside micro-balloons 50 will be described below.

In both top cover 20 and bottom cover 25, outer conductive layer 30 and inner conductive layer 35 are electrically connected to a voltage source such as battery 60 (one is connected to the positive terminal, the other to the negative terminal). In addition, detection circuit 65 is provided in one of the electronic components 15 (such as in or as part of a microprocessor provided on PCB 10). In the case of both top cover 20 and bottom cover 25, detection circuit 65 is electrically connected to the circuit consisting of outer conductive layer 30, inner conductive layer 35 and battery 60, each referred to as a cover circuit. As will be appreciated, each cover circuit is in a normally open condition due to the fact that insulating layer 40 is provided between each outer conductive layer 30 and inner conductive layer 35. Detection circuit 65 monitors both cover circuits for closed circuit conditions, i.e., a short between outer conductive layer 30 and inner conductive layer 35 of either top cover 20 or bottom cover 25, caused by an attempt to drill through or otherwise penetrate top cover 20 or bottom cover 25 to gain access to the electronic circuitry provided on PCB 10. As will be appreciated, such an attempt will bring outer conductive layer 30 and inner conductive layer 35 of the affected cover 20 or 25 into electrical contact with one another (the drill itself or chips from the drill may cause this), thereby causing the short. As a result, the voltage from battery 60 will be applied to and present on the shorted cover circuit. In the case of the embodiment shown in FIG. 2, such an attempt will puncture a number of the micro-balloons, thereby releasing the conductive liquid or powder which enhances the electrical connection between outer conductive layer 30 and inner conductive layer 35, and thus the short. When such a short is detected by detection circuit 65 (by sensing that the voltage from battery 60 is present on the cover circuit in question), detection circuit 65 generates and transmits a signal which causes some or preferably all of the sensitive information contained in the electronic circuitry provided on PCB 10, such as encryption keys, to be erased.

According to the preferred embodiment of the present invention shown in FIG. 1, spring contact fences 90 are provided to electrically connect each inner conductive layer 35 to battery 60 (a first terminal thereof). Partial front and side views of spring contact fence 70 are shown in FIGS. 3A and 3B, respectively. Each spring contact fence 70 is an elongated form made of a conductive material such as a copper alloy that includes L-shaped solid portion 75 and spring fingers 85. Solid portion 75 includes PCB contact portion 80. Preferably, each spring contact fence 70 extends around the entire outer periphery of PCB 10 (adjacent to the inner periphery of top cover 20 and bottom cover 25, as the case may be), and thus has the same general shape (e.g., a circular or rectangular shape) as top cover 20 and bottom cover 25. Each PCB contact portion 80 is electrically connected, such as by soldering, to a lead provided on PCB 10 that in turn is electrically connected to battery 60. Preferably, this lead is in the form of a circular or rectangular (or any other appropriately shaped) copper lead applied to PCB 10 that extends around the outer periphery of PCB 10 (and reconnects with itself). PCB contact portion 80 is placed on top of this lead and is electrically connected thereto, such as by soldering, thereby providing multiple points of electrical contact. Spring fingers 85 of each spring contact fence 70 contact inner conductive layer 35 of the respective top cover 20 or bottom cover 25. Preferably, spring fingers 85 are biased against the respective inner conductive layer 35 as a result of the bowed shape thereof shown in FIG. 3B. Spring contact fences 70, which preferably surround the electronic circuitry provided on PCB 10 that is to be protected, also act as a physical/mechanical barrier against attempts to access the inside of enclosure 5 by poking or probing under top cover 20 or bottom cover 25.

As also seen in FIG. 1, spring contact elements 90 are provided to electrically connect each outer conductive layer 30 to battery 60 (a second terminal thereof). Each spring contact element 90 is an elongated form made of a conductive material such as a copper alloy and includes solid portion 95 and spring fingers 100 similar to solid portion 75 and spring fingers 85 shown in FIGS. 3A and 3B. As was the case with spring contact fences 70, each spring contact element 90 preferably extends around the entire outer periphery of PCB 10 (adjacent to the outer periphery of top cover 20 and bottom cover 25, as the case may be), and thus has the same general shape (e.g., a circular or rectangular shape) as top cover 20 and bottom cover 25. Each solid portion 95 of each spring contact element 90 is electrically connected, such as by soldering, to a lead provided on PCB 10 that is in turn electrically connected to battery 60. As was the case with spring contact fences 70, this lead is preferably in the form of a circular or rectangular (or any appropriately shaped) copper lead applied to PCB 10 that extends around the entire periphery of PCB 10, concentrically with the lead used to connect the spring contact fences 70. The solid portion 95 of the spring contact element 90 in question is placed on top of this lead and is electrically connected thereto, such as soldering, thereby providing multiple points of electrical contact. Spring contact elements 90 provide an additional physical/mechanical barrier against intrusion attempts.

As seen in FIG. 1, top cover 20 and bottom cover 25 are connected to one another by a fastener, such as rivets 105. Where enclosure 5 covers only a portion of a printed circuit board, as is the case in FIG. 1, the remaining portions of the printed circuit board will extend outside of enclosure 5 (e.g., portions 110 and 115 of PCB 10 shown in FIG. 1), and rivets 105 will extend therethrough. Where enclosure 5 covers a printed circuit board in its entirety, typically only a connector, such as a multi-pin/multi-lead connector, will extend outside of enclosure 5 to allow for electrical connections to the enclosed printed circuit board to be made. The circuit connections from inside the enclosure 5 to the outside world are preferably made using the conductive layers of a multilayer printed circuit board. In particular, the layer leading to the outside world cannot be the outermost layers of the PC board circuitry because they would cause there to be an absence of continuity in the electrical contacts forming the fence around the inside of the enclosure.

Referring again to FIG. 1, enclosure 5 also includes cover switches 120. Each cover switch 120 is a micro-switch having a spring loaded plunger 125 that is upwardly biased. Each cover switch 120 is a closed position when plunger 125 is biased and pushed upward, and moves to an open position when plunger 125 is pushed downwardly against the upward biasing. As shown in FIG. 1, one cover switch 120 is provided on a top side of PCB 10 and is electrically connected to battery 60. When top cover 20 is put in place, inner conductive layer 35 pushes down on plunger 125 of the cover switch 120, thereby placing cover switch 120 in the open position. Thus, if an intruder removes rivets 105 and tries to lift up or remove top cover 20, the downward pressure applied by inner conductive layer 35 will be lessened or removed, causing plunger 125 of the cover switch 120 to be biased upwardly into the closed position, thereby causing a short. When cover switch 120 is in the closed position, a voltage from battery 60 will be applied to and be present on the circuit that includes cover switch 120. Detection circuit 65 monitors the circuit including cover switch 120 and battery 60, and when it detects that a voltage is present (meaning there has been a possible tamper attempt because top cover 25 has been lifted up), it generates and sends a signal which causes some or preferably all of the sensitive information contained in the electronic circuitry provided on PCB 10 to be erased. The other cover switch 120 shown in FIG. 1 is similarly placed and configured on the bottom side of PCB, and functions to facilitate detection of attempts to lift or remove bottom cover 25. It should be noted that the "cover circuits" described above and the circuits including cover switches 120 are parallel circuits, such that attempts to penetrate top cover 20 or bottom cover 25 and attempts to lift or remove top cover 20 or bottom cover 25 can be separately and independently detected.

Because the tamper detection circuits described herein rely on battery 60 to function, an intruder may attempt to disable such circuits by eliminating battery 60, i.e., eliminating its ability to provided a voltage. One way that battery 60 may be eliminated is by lowering or raising the temperature inside enclosure 5 sufficiently to make battery 60 non-functional. In order to protect against this type of an attack, enclosure 5 includes either or both of thermal sensor/switches 130 and 135. Thermal sensor/switch 130 is able to sense temperature changes and moves from an open to a closed position when the temperature inside enclosure 5 drops below a predetermined level (somewhere near, but not below, the temperature at which battery 60 stops functioning). Thermal sensor/switch 130 is electrically connected to battery 60. Detection circuit 65 is able to monitor the circuit including thermal sensor/switch 130, and when a voltage is detected as a result of thermal sensor/switch 130 moving to the closed position due to a temperature drop below the predetermined level (i.e., an intruder attempting to disable battery 60), detection circuit 65 can generate and transmit the signal described above that cause the sensitive information to be erased. Thermal sensor/switch 135, which is also electrically connected to battery 60, is similar to thermal sensor/switch 130, except that it moves from an open to closed position when the temperature inside enclosure 5 moves above a predetermined level (somewhere near, but not above, the temperature at which battery 60 stops functioning). When detection circuit 65 detects a voltage from battery 60 on the circuit including thermal sensor/switch 135, it generates and sends the signal that causes the sensitive information to be erased. Thus, thermal sensor/switch 130 and thermal sensor/switch 135 are able to independently detect and foil tamper attempts that involve disabling battery 60 through raising or lowering the temperature of enclosure 5. Suitable devices that may be used for thermal sensor/switch 130 or thermal sensor/switch 135 are the thermal sensors/switches sold under the name Klixon® by Texas Instruments, Inc. These devises consist of a bi-metal spring loaded disk-shaped element that has a first, typically concave, form that does not make electrical contact with a provided lead (the switch is open) under first temperature conditions, and shifts to a second, typically convex, form that does make electrical contact with the provided lead (the switch is closed) when the temperature conditions change (either above or below a threshold value). Alternatively, the functionality of either or both of thermal sensor/switch 130 or thermal sensor/switch 135 may be provided by a temperature sensor provided on PCB 10. In this embodiment, detection circuit 65 would monitor the sensed temperature, and when it moves above a predetermined level or falls below a predetermined level, detection circuit 65 would generate and transmit the sensitive information erasing signal described above. As still a further alternative, one of cover switches 120 and either or both of thermal sensor/switches 130 and 135 may combined into a single device. Such devices could be manufactured by a company such as Texas Instruments, Inc. under the Klixon® name using standard elements already manufactured by them. The circuit including thermal sensor/switch 130 and/or thermal sensor switch 135, or any device providing the same functionality, are preferably parallel to the other tamper detection circuits described herein so that each of the different types of tamper attempts described herein can be independently detected.

Referring to FIG. 4, a partial schematic of the device of FIG. 1 is shown. Battery 60 and detection circuit 65 are shown with detection circuit output 65a shown. A first circuit 20a monitors the top cover 20 using components 30, 35, and 40. A second circuit 25a monitors the bottom circuit 25 using components 30, 35 and 40. A third circuit 120a monitors the top cover switch 120 and a fourth circuit 120b monitors the bottom cover switch 120. Temperature indicating means circuit 130a uses temperature switch 130 to monitor temperature.

While preferred embodiments of the invention have been described and illustrated above, it should be understood that these are exemplary of the invention and are not to be considered as limiting. Additions, deletions, substitutions, and other modifications can be made without departing from the spirit or scope of the present invention. Accordingly, the invention is not to be considered as limited by the foregoing description but is only limited by the scope of the appended claims.

What is claimed is:

1. An enclosure for covering and protecting from tamper attempts at least a portion of a printed circuit board including one or more electronic components, comprising:

a top cover for covering a top side of said at least a portion of a printed circuit board, said top cover including a first outer conductive layer, a first inner conductive layer, and a first insulating layer between said first outer conductive layer and said first inner conductive layer, said first outer conductive layer and said first inner conductive layer being electrically connected to a voltage source to form a first circuit;

a bottom cover for covering a bottom side of said at least a portion of a printed circuit board, said bottom cover including a second outer conductive layer, a second inner conductive layer, and a second insulating layer between said second outer conductive layer and said second inner conductive layer, said second outer conductive layer and said second inner conductive layer being electrically connected to said voltage source to form a second circuit;

a first cover switch provided on said top side of said at least a portion of a printed circuit board, said first cover switch being electrically connected to said voltage source to form a third circuit, said first cover switch being in an open position when said top cover is provided on said top side and a closed position when said top cover is lifted away from said top side;

a second cover switch provided on said bottom side of said at least a portion of a printed circuit board, said second cover switch being electrically connected to said voltage source to form a fourth circuit, said second cover switch being in an open position when said bottom cover is provided on said bottom side and a closed position when said bottom cover is lifted away from said bottom side;

means for indicating that a temperature inside the enclosure has moved past a predetermined level; and a detection circuit for generating and transmitting a signal to cause certain information contained in the one or more electronic components to be erased when said detection circuit detects a voltage from said voltage source being present on said first circuit, said second circuit, said third circuit or said fourth circuit or when said indicating means indicates to said detection circuit that said temperature has moved past said predetermined level.

2. An enclosure according to claim 1, wherein said voltage is present on said first circuit when said first outer conductive layer is brought into electrical contact with said first inner conductive layer, said second circuit when said second outer conductive layer is brought into electrical contact with said second inner conductive layer, said third circuit when said first cover switch is in said closed position, and said fourth circuit when said second cover switch is in said closed position.

3. An enclosure according to claim 1, said predetermined level being a lower threshold level, said indicating means indicating that said temperature has moved below said lower threshold level.

4. An enclosure according to claim 3, said indicating means being a thermal sensor/switch electrically connected to said voltage source to form a fifth circuit, said thermal sensor/switch moving from an open position to a closed position when said temperature has moved below said lower threshold level such that said voltage from said voltage source is present on said fifth circuit and indicates to said detection circuit that said temperature has moved below said lower threshold level.

5. An enclosure according to claim 3, said indicating means being a thermal sensor/switch electrically connected to said voltage source to form a fifth circuit, said thermal sensor/switch moving from an open position to a closed position when said temperature has moved above said upper threshold level such that said voltage from said voltage source is present on said fifth circuit and indicates to said detection circuit that said temperature has moved below said upper threshold level.

6. An enclosure according to claim 1, said predetermined level being an upper threshold level, said indicating means indicating that said temperature has moved above said upper threshold level.

7. An enclosure according to claim 1, said first inner conductive layer being electrically connected to said voltage source by a first spring contact fence extending around an outer periphery of said top side and said second inner conductive layer being electrically connected to said voltage source by a second spring contact fence extending around an outer periphery of said bottom side.

8. An enclosure according to claim 7, said first spring contact fence comprising a plurality of spring fingers in contact with said first inner conductive layer and a solid portion electrically connected to a first lead extending around said outer periphery of said top side, said first lead being electrically connected to said voltage source, and said second spring contact fence comprising a plurality of spring fingers in contact with said second inner conductive layer and a solid portion electrically connected to a second lead extending around said outer periphery of said bottom side, said second lead being electrically connected to said voltage source.

9. An enclosure according to claim 8, said solid portions being L-shaped.

10. An enclosure according to claim 1, said first outer conductive layer being electrically connected to said voltage source by a first spring contact element extending around an outer periphery of said top side, and said second outer conductive layer being electrically connected to said voltage source by a second spring contact element extending around an outer periphery of said bottom side.

11. An enclosure according to claim 10, said first spring contact element comprising a plurality of spring fingers in contact with said first outer conductive layer and a solid portion electrically connected to a first lead extending around said outer periphery of said top side, said first lead being electrically connected to said voltage source, and said second spring contact element comprising a plurality of spring fingers in contact with said second outer conductive layer and a solid portion electrically connected to a second lead extending around said outer periphery of said bottom side, said second lead being electrically connected to said voltage source.

12. An enclosure according to claim 1, said first cover switch having an upwardly biased moveable plunger in contact with said first inner conductive layer when said top cover is provided on said top side, said first cover switch changing from said open position to said closed position depending on a position of said plunger, and said second cover switch having an upwardly biased moveable plunger in contact with said second inner conductive layer when said bottom cover is provided on said bottom side, said second cover switch changing from said open position to said closed position depending on a position of said plunger.

13. An enclosure according to claim 1, said first and second insulating layers including a plurality of microballoons filled with a conductive material.

14. An enclosure according to claim 13, said material being a liquid.

15. An enclosure according to claim 13, said material being a powder.

16. An enclosure for covering and protecting from tamper attempts at least a portion of a printed circuit board including one or more electronic components, comprising:
a top cover for covering a top side of said at least a portion of a printed circuit board, said top cover including a first outer conductive layer, a first inner conductive layer, and a first insulating layer between said first outer conductive layer and said first inner conductive layer, said first outer conductive layer and said first inner conductive layer being electrically connected to a voltage source to form a first circuit;
a bottom cover for covering a bottom side of said at least a portion of a printed circuit board, said bottom cover including a second outer conductive layer, a second inner conductive layer, and a second insulating layer between said second outer conductive layer and said second inner conductive layer, said second outer conductive layer and said second inner conductive layer being electrically connected to said voltage source to form a second circuit;
a first cover switch provided on said top side of said at least a portion of a printed circuit board, said first cover switch being electrically connected to said voltage source to form a third circuit, said first cover switch being in an open position when said top cover is provided on said top side and a closed position when said top cover is lifted away from said top side;
a second cover switch provided on said bottom side of said at least a portion of a printed circuit board, said second cover switch being electrically connected to said voltage source to form a fourth circuit, said second cover switch being in an open position when said bottom cover is provided on said bottom side and a closed position when said bottom cover is lifted away from said bottom side;
a temperature sensor for indicating that a temperature inside the enclosure has moved past a predetermined level; and
a detection circuit for generating and transmitting a signal to cause certain information contained in the one or more electronic components to be erased when said detection circuit detects a voltage from said voltage source being present on said first circuit, said second circuit, said third circuit or said fourth circuit or when said temperature sensor indicates to said detection circuit that said temperature has moved past said predetermined level.

17. An enclosure according to claim 16, wherein said voltage is present on said first circuit when said first outer conductive layer is brought into electrical contact with said first inner conductive layer, said second circuit when said second outer conductive layer is brought into electrical contact with said second inner conductive layer, said third circuit when said first cover switch is in said closed position, and said fourth circuit when said second cover switch is in said closed position.

18. An enclosure according to claim 16, said predetermined level being a lower threshold level, said temperature sensor indicating that said temperature has moved below said lower threshold level.

19. An enclosure according to claim 18, said temperature sensor being a thermal sensor/switch electrically connected to said voltage source to form a fifth circuit, said thermal sensor/switch moving from an open position to a closed position when said temperature has moved below said lower threshold level such that said voltage from said voltage source is present on said fifth circuit and indicates to said detection circuit that said temperature has moved below said lower threshold level.

20. An enclosure according to claim 18, said temperature sensor being a thermal sensor/switch electrically connected to said voltage source to form a fifth circuit, said thermal sensor/switch moving from an open position to a closed position when said temperature has moved above said upper threshold level such that said voltage from said voltage source is present on said fifth circuit and indicates to said detection circuit that said temperature has moved below said upper threshold level.

21. An enclosure according to claim 16, said predetermined level being an upper threshold level, said temperature sensor indicating that said temperature has moved above said upper threshold level.

22. An enclosure according to claim 16, said first inner conductive layer being electrically connected to said voltage source by a first spring contact fence extending around an outer periphery of said top side and said second inner conductive layer being electrically connected to said voltage source by a second spring contact fence extending around an outer periphery of said bottom side.

23. An enclosure according to claim 22, said first spring contact fence comprising a plurality of spring fingers in contact with said first inner conductive layer and a solid portion electrically connected to a first lead extending around said outer periphery of said top side, said first lead being electrically connected to said voltage source, and said second spring contact fence comprising a plurality of spring fingers in contact with said second inner conductive layer and a solid portion electrically connected to a second lead extending around said outer periphery of said bottom side, said second lead being electrically connected to said voltage source.

24. An enclosure according to claim 23, said solid portions being L-shaped.

25. An enclosure according to claim 16, said first outer conductive layer being electrically connected to said voltage source by a first spring contact element extending around an outer periphery of said top side, and said second outer conductive layer being electrically connected to said voltage source by a second spring contact element extending around an outer periphery of said bottom side.

26. An enclosure according to claim 25, said first spring contact element comprising a plurality of spring fingers in contact with said first outer conductive layer and a solid portion electrically connected to a first lead extending around said outer periphery of said top side, said first lead being electrically connected to said voltage source, and said second spring contact element comprising a plurality of spring fingers in contact with said second outer conductive layer and a solid portion electrically connected to a second lead extending around said outer periphery of said bottom side, said second lead being electrically connected to said voltage source.

27. An enclosure according to claim 16, said first cover switch having an upwardly biased moveable plunger in contact with said first inner conductive layer when said top cover is provided on said top side, said first cover switch changing from said open position to said closed position depending on a position of said plunger, and said second cover switch having an upwardly biased moveable plunger in contact with said second inner conductive layer when said bottom cover is provided on said bottom side, said second cover switch changing from said open position to said closed position depending on a position of said plunger.

28. An enclosure according to claim 16, said first and second insulating layers including a plurality of microballoons filled with a conductive material.

29. An enclosure according to claim 28, said material being a liquid.

30. An enclosure according to claim 28, said material being a powder.

* * * * *